United States Statutory Invention Registration [19]

[11] Reg. Number: H939

Holland

[43] Published: Jul. 2, 1991

[54] COMMUTATOR PULSE TACHOMETER

[75] Inventor: Orgal T. Holland, Fredericksburg, Va.

[73] Assignee: The United States of America as represented by the Secretary of the Navy, Washington, D.C.

[21] Appl. No.: 415,743

[22] Filed: Oct. 2, 1989

[51] Int. Cl.[5] ..... G01P 3/48

[52] U.S. Cl. ..... 324/166; 324/177

[58] Field of Search ..... 324/166, 168, 173, 174, 324/177; 318/799; 388/846

[56] References Cited

U.S. PATENT DOCUMENTS

| | | | |
|---|---|---|---|
| 3,346,725 | 12/1967 | Allured et al. | 324/177 |
| 3,558,129 | 12/1974 | Liden . | |
| 3,835,326 | 9/1974 | Gerue et al. . | |
| 3,934,200 | 1/1976 | Schoonover et al. . | |
| 4,000,465 | 12/1976 | Sugiyama | 324/166 |
| 4,574,237 | 4/1986 | Hatchel et al. . | |
| 4,788,497 | 11/1988 | Kutsumura . | |

*Primary Examiner*—Linda J. Wallace

*Attorney, Agent, or Firm*—John D. Lewis; Kenneth E. Walden

[57] ABSTRACT

A tachometer for measuring speed and armature position of a motor is disclosed whereby the counter electromotive force present in spikes on the power terminals are shaped, analyzed and displayed as tachometer information. The spikes occur as commutation takes place allowing a coarse angular armature shaft position to also be derived.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMMUTATOR PULSE TACHOMETER

STATEMENT OF GOVERNMENT INTEREST

The invention described herein may be manufactured and used by or for the Government of the United States of America for the Government of the United States of America for governmental purposes without the payment of any royalties thereon or therefor.

BACKGROUND OF THE INVENTION

The present invention relates to a device for measurement of rotational speed or position. More particularly, a tachometer and angular position indicator for use on an electric motor is disclosed. The concept works on all electrical motors that exhibit counter EMF pulses present on the power connections. The device detects energy imparted to the power supply terminals of a motor by the counter electromotive force produced during commutation. The detection of this phenomena is harnessed to and used in various applications, including sensing of motor rotational speeds and angular positions.

Typically, shaft angular position and rotational speed of an electric motor or other similar rotational transducer is accomplished by use of analog synchronous or digital encoder devices which may be integrated internally to a motor assembly, but are most commonly mounted external to the motor on the output shaft.

Analog synchronous devices take advantage of the phenomena of induced current in a conductor from a time varying magnetic field. In such an arrangement, a device consisting of a magnetic material and an inductive pick-up coil of conductor is attached to a rotor of a motor. As the magnet rotates, the magnetic field sensed by the conductor coil varies with time and thus induces a current flow in the conductor. The rotational speed of the magnet and hence the rotational speed of the motor shaft can be determined by measuring this current.

Digital encoder devices include those which consist of a disk of alternately transparent and opaque material. This disk is connected to the shaft of a motor. A stationary light source is placed on one side of the plane of the disk, a light detection device is similarly placed directly opposite. As the motor turns the disk, an electrical pulse is generated by the light detection device each time a transition from transparent to opaque is encountered. Counting these transitions allows a determination of disk (and hence motor) position and speed.

For example, Schoonover et al. (U.S. Pat. No. 3,934,200) Jan. 20, 1976 disclose a tachometer circuit comprising a nonlinear DC tachometer which produces an output voltage having an AC ripple. After removing the DC component, the AC voltage ripple is inverted and isolated. The AC voltage ripple is used to establish a nonlinear ripple-free output voltage and a means for linearizing the nonlinear ripple free output voltage. This reference filters the counter-EMF signal which Applicant utilizes to advantage.

Another device is Liden (U.S. Pat. No. 3,858,109) filed Dec. 31, 1974 which discloses a brushless tachometer. An alternating current variable permeance resolver is mechanically coupled to rotate in synchronism with a direct current brushless generator, the rotor of which is rotated at a speed desired to be measured. The generator produces two alternating current voltages. These two AC voltages are modulated by an AC voltage the frequency of which is very high relative to the maximum design generator-resolver rotational speed. The voltage at the output winding is therefore proportional to the speed components of the generator signal. The output signal is then demodulated at the same modulation frequency thereby to provide a DC output signal proportional to the rate of rotation of the generator rotor.

Another example is Katsumura (U.S. Pat. No. 4,788,492) filed Nov. 29, 1988 which is a reference disclosing an apparatus for measuring and detecting the speed and position of a rotating shaft of an electric motor. A commutator is provided having three or more poles. First and second brushes are provided in sliding contact with the commutator for supplying electrical power to the poles of the commutator. At least one of the poles is in electrical communication with the shaft. Rotation detection means measure the electrical potential difference between the shaft and ground and generate a rotation information signal in response to the changes in the electric potential differences as the shaft rotates.

Still another specially constructed device of general interest to the field of motor speed and angular position measuring is Howlett (U.S. Pat. No. 4,689,532) filed Aug. 25, 1987. Therein a ferrite sensor self-control synchronous motor is disclosed. A self-controlled synchronous motor is provided with at least one armature winding, a rotor rotatably mounted for rotation in proximity to the winding and a magnet located on the rotor for providing a magnetic flux. A sensor wire is located within the vicinity of variations in magnetic field intensity produced by rotor rotation and provides an output electrical signal indicative of the position of the rotor. Counting voltage pulses provides a rotational velocity output.

Many of these devices traditionally provide extremely accurate measurement of shaft angular position and shaft speed, but at the penalty of physically modifying the motor shaft by mechanical connection. Some motors are equipped with extended shafts to accommodate these connections, but may are not. Many applications do not allow physical placement of such devices on motor shafts because of mechanical constraints such as size or shaft loading. These drawbacks as well as the restrictive expense of such devices often prohibit their use in some applications.

SUMMARY OF THE INVENTION

Accordingly, it is an object of the present invention to provide a means of detecting the energy imparted to the power supply terminals of a motor by the counter electromotive force produced during commutation and from this energy indicate motor rotational speed and armature angular position.

It is another object of the present invention to teach a method of measuring motor speed and armature angular position without the need to modify the motor shaft or armature.

It is still another object of the present invention to teach a tachometer device that requires no mechanical or optical connection to the DC motor shaft.

It is a further object of the present invention to teach a tachometer device that connects with two simple standard electrical connections to the power connections of any DC motor.

For a better understanding of these and other objects and aspects of the invention, reference may be made to the following detailed description taken in conjunction with the accompanying drawings wherein:

DETAILED DESCRIPTION OF THE INVENTION

The concept extended here presents a device which performs the functions of determining motor shaft angle and shaft rotational speed without the addition of a physical connection to the motor shaft. The device functions by detecting the energy imparted to the power supply terminals of the motor by the counter electromotive force (CEMF) produced during commutation. The concept presented here is that an electronic device may be so constructed as to detect the periodic fluctuations impressed upon the power connection terminals of any mechanism exhibiting a counter electromotive effect and in detecting these fluctuations be capable of determining the rotational velocity and relative position (in the case of a rotational electrical motor) to a usable degree of accuracy. The physical phenomena observed here is classically described by Faraday's law which relates the magnetic flux through a closed path to the voltage induced around the path. The effect is such that when the flux of a magnetic field acting on an electric circuit is changed, a voltage is induced in the circuit. This phenomena, known as electromagnetic induction of voltage, is basic to the operation of such common electrical devices a transformers, generators and motors.

Using this basic relationship, the voltage, e, induced in an N-turn coil where the flux, $\phi$, in webers, threading through the coil is given by Farraday's Law as follows:

$$e = N\frac{\Delta\phi}{\Delta t} \qquad \text{Equation 1}$$

where $\Delta\phi$ is a change in flux and $\Delta t$ is the change in time.

A derivative formula known as Lenz's Law describes the direction of the induced voltage, e, as indicative of opposing flux change. Lenz's Law:

$$e = N\frac{\Delta\phi}{\Delta t} = N\frac{\Delta\phi}{\Delta i}\ \frac{\Delta i}{\Delta t} = L\frac{\Delta i}{\Delta t} \qquad \text{Equation 2}$$

gives you the voltage, counter electromotive force (CEMF) wherein N equals the number of turns in a coil and i is the current in amps and L inductance in Henrys.

Using these basic formulas, the speed and coarse position of a motor armature shaft can be measured, analyzed and displayed as tachometer and position information.

Figure 1:
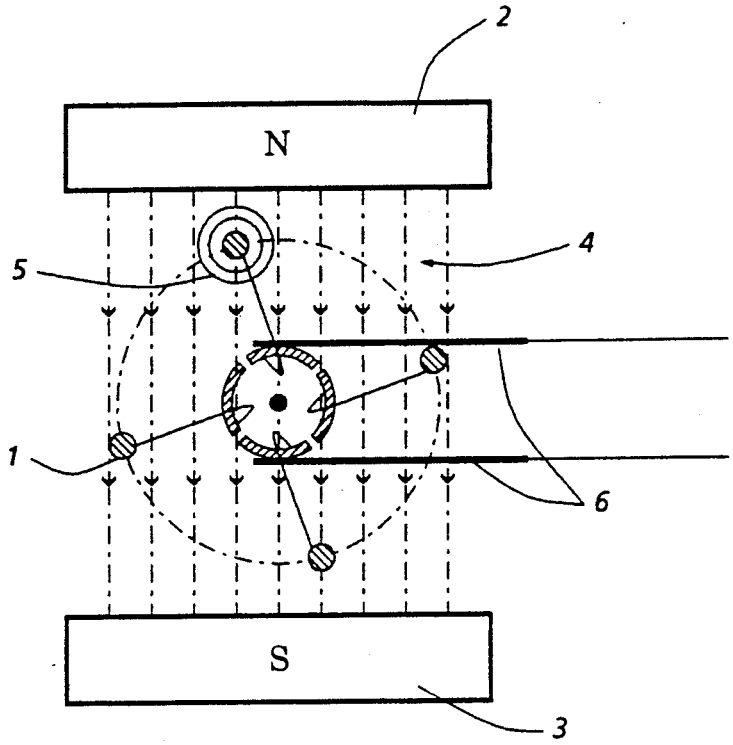
FIG. 1 is a functional representation of a standard DC motor.

Turning now to FIG. 1, a general permanent magnet direct current type motor is disclosed. FIG. 1 shows a typical armature winding (1) in which a voltage will be induced. A magnetic field (4) is provided by the indicated permanent magnets (2) and (3) surrounding the armature. (In large machines the flux is often provided by a field winding.)

As current begins to flow in the armature winding (1), an increase in magnetic field produced by the current in the winding begins. The magnetic field induced by the winding current (5) attempts to align itself in opposition to the field provided by the permanent magnets (4). This aligning process forces the armature to physically rotate. As this rotation continues commutation occurs, reversing the direction of current flow in the armature windings and so changing the direction of the force. As this process is repeated, rotary motion is observed on the output shaft with a magnitude of torque proportional to the produce of the field strengths.

During the instant of commutation, the magnetic field existing in the armature (5) begins to collapse. Having reversed the impressed voltage on the armature by commutation and as the original magnetic field collapses, by Lenz's Law (EQ-2) the changing flux (5) would now have the tendency to oppose the change in current. This opposition produces an electromotive force impressed onto the motor brushes (6) and it is this which may be detected by appropriate circuitry to discern motor rotational position and velocity.

In this sense, every motor is a generator at the same time it is developing mechanical power at the shaft. The generated voltage, a counter electromotive force (CEMF), appears in the fundamental action versus reaction equation for a motor (equation 3).

$$V\,\text{applied} = CEMF + IR \qquad \text{Equation 3}$$

where V applied is the voltage applied to the brushes and I is the current flowing in the armature winding and R is the resistive drop in ohms across the armature winding.

Figure 2:
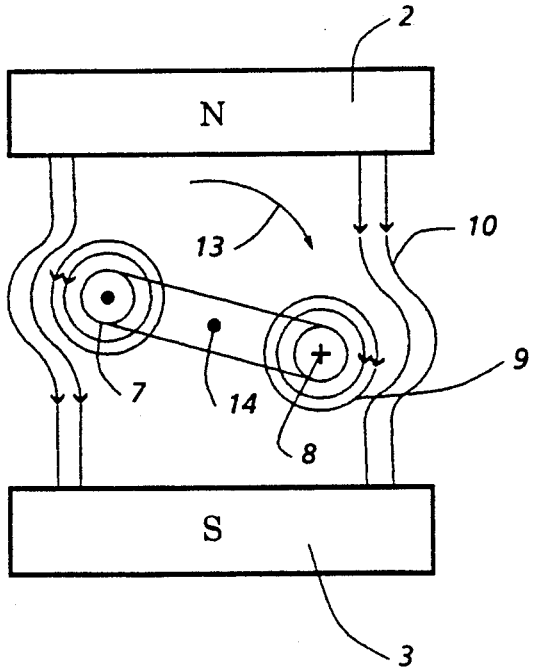
FIG. 2 is a pictorial representation of an armature winding with a two-pole motor.

FIG. 2 shows a functional diagram of a motor wherein one loop of an armature winding is broken out in a manner best illustrating the interaction of the flux in the armature winding as it interacts with the flux field of the motor. Therein, the center of the armature shaft 14 is shown with a single armature winding where the cross-section showing a negative current flow 7 is contrasted with a cross-section of the winding exhibiting a positive current flow 8. The magnetic field surrounding the armature winding 9 interacts with the flux field of the motor 10 which creates the rotational torque 13.

Figure 3:
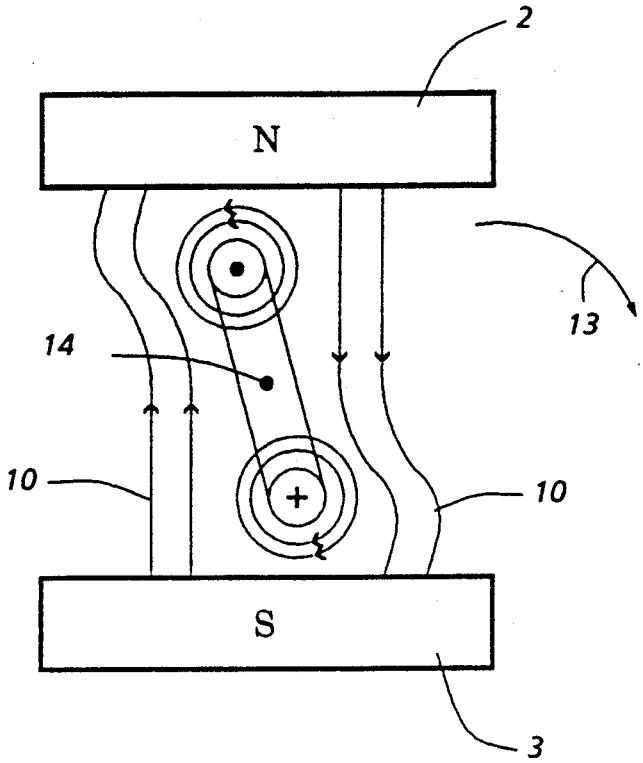
FIG. 3 is a representation of the motor of FIG. 2 as the armature rotated to the next quadrant.
Figure 4:
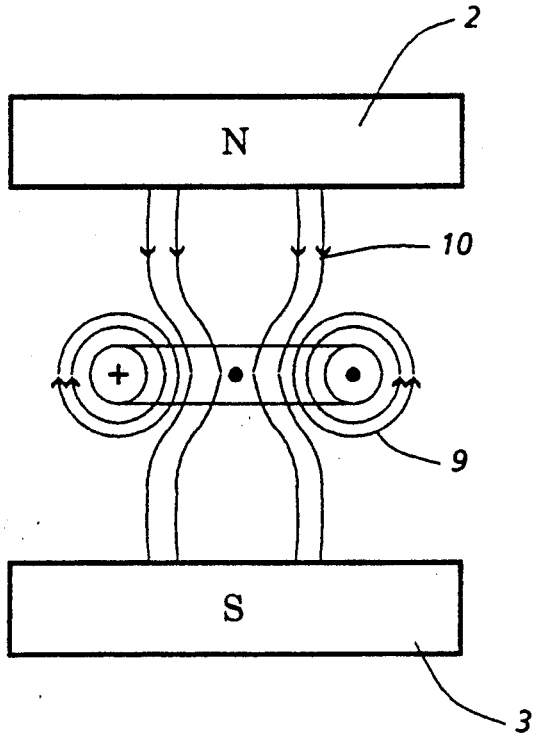
FIG. 4 is a representation of the motor of FIG. 3 with the armature rotating onto the next quadrant.

FIG. 3 illustrates how the torque 13 varies as the armature rotates until the armature is positioned with the armature field 9 aligned with the motor field 10, (FIG. 4). At this time commutation occurs and a voltage spike results as from the changes in the armature flux field. This spike is counter electromotive force and is the voltage harnessed by Applicant to provide an indication of shaft speed and rough angular position.

The shaft position is as definitive as allowed by the number of commutator sections, which correspond to the number of armature windings. A simple 4 pole DC motor would therefore provide shaft position in 90 degree increments from the position known in association with the preceding pulse. To utilize this coarse position it is necessary that the shaft position be known at some initial time so as to synchronize the quadrant with true armature shaft position. This coarse position information is often valuable when dealing with high ratio mechanical gear trains. As the number of armature windings increase, the number of commutator elements increase and the positional resolution increases.

While the embodiment built and tested by Applicant utilized a 4 pole DC motor thus indicating angular position in 90 degree increments, it is within the scope of Applicant's invention to use the CEMF from AC motors as well as DC motors, independent of the number of windings and commutator elements employed.

Figure 5:
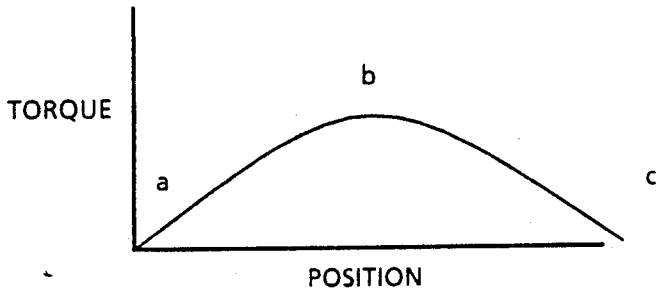
FIG. 5 is a graph of the torque produced by the motor depicted in FIGS. 2, 3 and 4.

FIG. 5 is a graph of the torque produced by a two winding motor such as illustrated in FIG. 2, 3 and 4. In this simple illustration, position indication is independent of motor load. FIG. 5 graphs torque on the X axis and position on the Y axis with point a corresponding to FIG. 2, point b to FIG. 3 and c to FIG. 4. It is interesting to note that commutation must take place at points a and c and that the torque line displayed in FIG. 5 corresponds to the rise and fall of induced voltage in the brushes. By detecting and counting the peak of each voltage cycle an accurate measure of the revolutions of the armature can be calculated and displayed.

Figure 6:
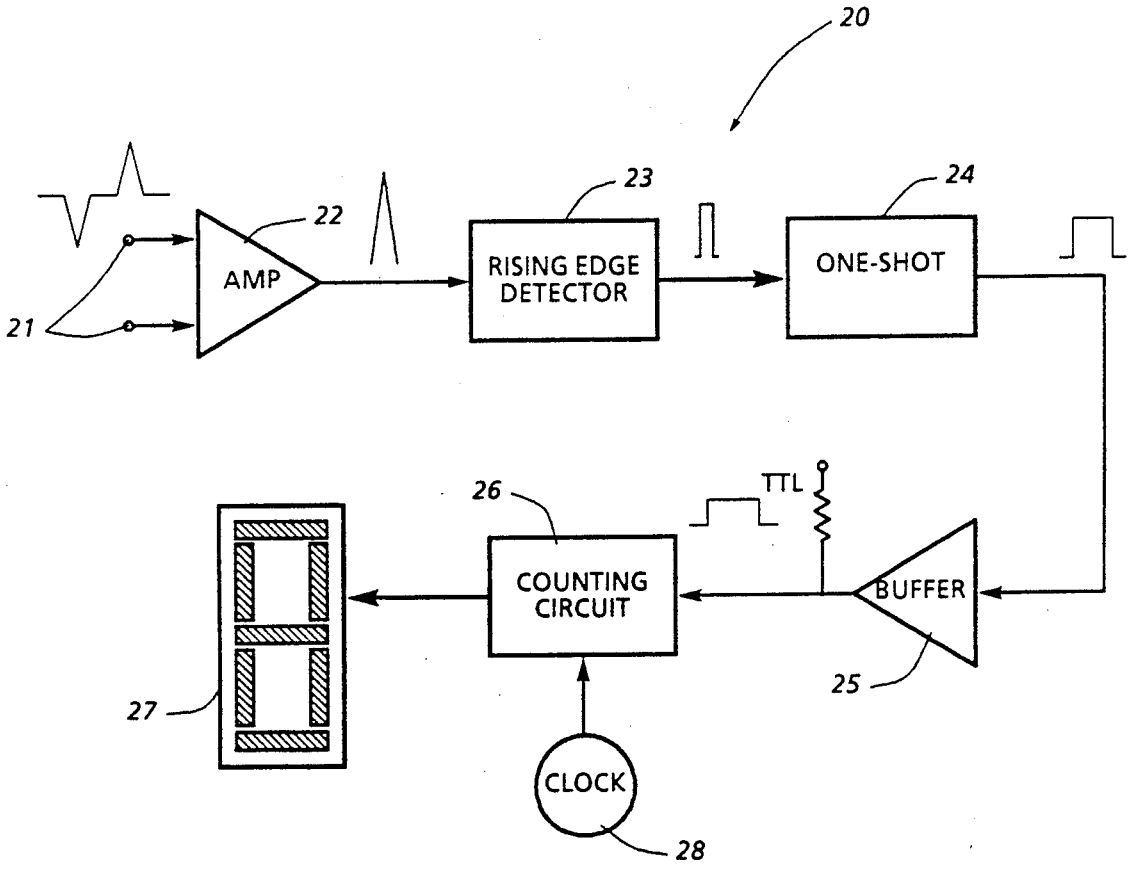
FIG. 6 is a block diagram of Applicant's tachometer.

FIG. 6 is a block diagram of one embodiment of Applicant's device used to measure and display the speed and coarse armature position of a motor wherein numeral 20 designates Applicant's device generally. Therein, a spiked pulse train 21 is fed into an amplifier 22. Applicant used a standard off-the-shelf operational amplifier with twin differential inputs corresponding to the power connections on an electric motor. Pulse train 21 is the output of CEMF present on the power connections to a motor and the spikes represent the CEMF generated at each commutation as the motor armature rotates. The output of amplifier 22 is then sent to a rising edge detection circuit 23. Applicant used a standard rising edge detecting circuit, but any circuitry that has the capability to detect pulses would function and be within the scope of Applicant's invention. The output of edge detector 23 is then shaped by transmitting through a one-shot multivibrator 24 and then through a buffer 25 whereby each pulse is stretched in duration and shaped in amplitude into a square wave which is the input to a counting circuit 26 that provides the proper output to drive a display 27 to display speed and/or coarse shaft position. Any circuitry with the capability to count pulses will provide a digital output, but circuitry providing an analog output is also considered within the scope of Applicant's invention.

In the embodiment built and tested by Applicant, detection circuit 23 detected the leading edge of each pulse, but it should be understood that any circuitry that provided an output spike corresponding to each spike of CEMF present on input signal 21 would be within the scope and function of Applicant's tachometer.

By noting the initial position of the motor, position can be easily determined by the count outputted by counting circuit 26. The addition of a clock 28 allows the number of pulses during a period of time to be measured, thus allowing rotational speed to be expressed in rotations per unit of time such as rotations per minute (RPM).

It will be understood that various changes in the details, steps and arrangement of parts which have been herein described and illustrated in order to explain the nature of the invention, may be made by those skilled in the art within the principle and scope of the invention as expressed in the appended claims.

What is claimed is:

1. A tachometer for measuring speed and armature position of an AC motor comprising:

means for detecting counter electromotive force commutator pulses; and means for amplifying counter electromotive force (CEMF) pulses from the motor; and means for pulse shaping the pulses from said means for detecting; and a counting circuit to count the pulses shaped by said means for pulse shaping; and means for analyzing the pulses counted by said counting circuit to determine speed of coarse angular armature position; and means for displaying the speed or position found by said means for analyzing; and means for connecting said means for amplifying to the power terminals of the motor.

2. A tachometer according to claim 1 wherein said means for pulse shaping is comprised to a one-shot multivibrator to stretch the CEMF pulses and a buffer to shape them into a square wave.

3. A tachometer for measuring speed and armature position of a DC motor comprising:

a differential operational amplifier in electrical connection with the power connections on the DC motor; and a one-shot multivibrator to stretch the pulses outputted by said differential amplifier; and a buffer to shape the output of said one-shot multivibrator into a series of square ware pulses; and a leading edge detector to count the pulses from said buffer and provide a digital output; in electrical connection with a digital display to display tachometer information indicating the speed of the DC motor.

4. A tachometer according to claim 3 wherein said leading edge detector works in conjunction with a clock whereby the output can be displayed as rotations per minute (RPM).

5. A tachometer according to claim 4 wherein the output is displayed as coarse armature position information.

* * * * *